A. H. PARSONS.
COLLAR FOR NECKWEAR.
APPLICATION FILED JUNE 15, 1908.

1,023,223.

Patented Apr. 16, 1912.

ATTEST
E. M. Fisher
F. C. Mumm

INVENTOR
Arthur H. Parsons
BY Fisher & Moser Attys.

COLUMBIA PLANOGRAPH CO., WASHINGTON, D. C.

UNITED STATES PATENT OFFICE.

ARTHUR H. PARSONS, OF CLEVELAND, OHIO, ASSIGNOR TO THE PARSONS & PARSONS COMPANY, OF CLEVELAND, OHIO, A CORPORATION OF OHIO.

COLLAR FOR NECKWEAR.

1,023,223.  Specification of Letters Patent.  Patented Apr. 16, 1912.

Application filed June 15, 1908. Serial No. 438,525.

*To all whom it may concern:*

Be it known that I, ARTHUR H. PARSONS, a citizen of the United States, residing at Cleveland, in the county of Cuyahoga and State of Ohio, have invented certain new and useful Improvements in Collars for Neckwear, and do declare that the following is a full, clear, and exact description of the invention, which will enable others skilled in the art to which it appertains to make and use the same.

My invention relates to collars for neckwear, and the invention consists in a collar having button hole extensions permanently attached thereto, all substantially as shown and described and particularly pointed out in the claims.

Figure 1:
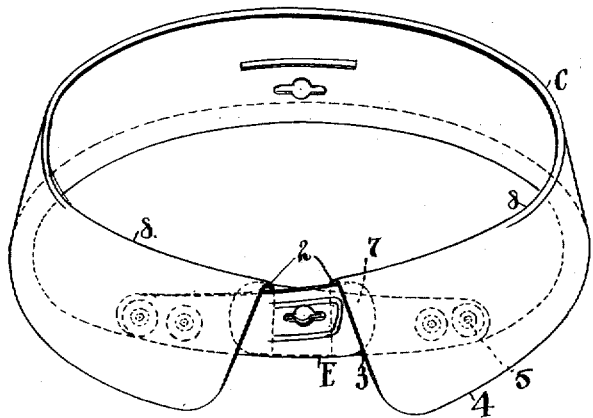
Figure 2:
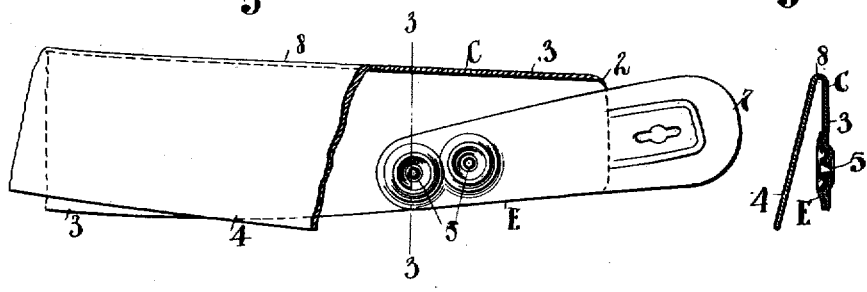
Figure 3:
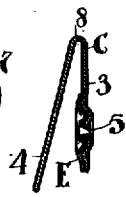
Figure 4:
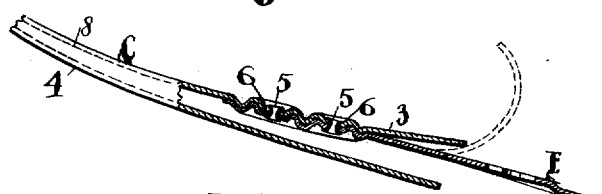
Figure 5:
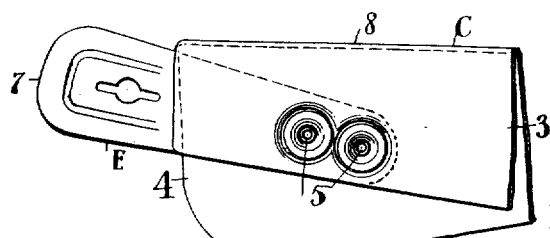

In the accompanying drawings, Figure 1 is a front view of a collar embodying my invention in buttoned relation. Fig. 2 is a view of one end of the collar with its extension and the lay-down portion of the collar broken away. Fig. 3 is a cross section of the collar complete on a line corresponding to 3—3, Fig. 1. Fig. 4 is a longitudinal section of one end of the collar on the line of the rivet fastenings. Fig. 5 is an inside view of one end of the collar.

The first essential idea herein is the permanently affixed button-hole extension E to the neck band 3 of the collar. As herein shown the said collar C is of the laydown or turn down kind but not necessarily because the collar might have a turn-down wing and come within my invention. It will also be understood that while the invention relates to collars generally, regardless of the material out of which they are made, it is intended to apply more particularly to celluloid, hard rubber and like collars which always retain their shape and do not require starching. Several distinguishing peculiarities enter into the present construction and notably the place and means of attachment of said extensions and the shape and relation thereof to the collar. By the term "collar" I mean in this instance the neck band or portion 3 and the lay down or turn down portion 4, but not including the extension E. This distinction is made to promote definiteness in the description and claims, recognizing of course that the article is not commercially complete without said extensions. Having reference, first, to the shape of the said extensions, and their proportions and relations, it will be seen that they are shown as being largest at their front rounded ends 7 and taper thence gradually to their rear or inner ends, so that said inner ends are only about half as wide as the front or outer ends. The lines of taper also are straight or parallel, as shown, but the really essential thing as to this taper is to get the extension as far away as can well be from the fold line 8 of the collar after it leaves the initial corner 2 of the fold at the extremity of the collar. From this point the retreat should be decided so as not to interfere with the easy and natural adaptation of the collar to the neck. This is especially important in turn-down collars which incline to be stiff and not easily bent at their ends and do not incline to shape themselves to the neck at this point. Hence if the extensions E were to run back as far as shown and have full width the three ply thickness of stock would make them well nigh unmanageable to bend but would rather hold to a straight and unsightly and uncomfortable position. But by narrowing the extensions and carrying them away as far as possible from the two ply edge 8, I find that they do not interfere with shapeliness and comfort and are also made otherwise free for handling, which could not occur if they ran full length up under the collar fold. Again, this construction supplements and fills out the full width of the collar at its transverse edge X when the extension emerges from beneath the turn-down portion and when, so far as a front view is concerned, it is merely the usual button hole tongue of the collar and nothing more is seen. At this point, however, said extension is just enough narrower than the collar band to keep it out of contact with the curve of the corner 2 and thus avoid abrasion or injury therein and thereby also preserving the integrity of said corner. This is vital, for it is in this corner that collars usually break down first and are rendered unwearable. This of course is largely due to the short button hole tongues which have always heretofore started from this edge and through which breakage at 2 is easy. But by keeping my extensions free at 2 and having the point of attachment well back and low on the collar, the said extensions can be easily manipulated both in buttoning and unbuttoning without even soiling the collar proper. As to the place and manner of fastening for the said extensions it will be seen that more than half the entire length is within the collar and that only the shorter portion projects beyond the collar. Indeed, as shown herein, the free portion behind edge x and in front of rivets or eyelets 5, is equally as long as the exposed portion thereof. This affords great freedom to the extension for handling while it serves all the practical purposes of an ordinary button hole tongue in other ways. The lower edge thereof is also shown as in a line with the lower edge of the collar, so that all the taper effect of the extension comes at its upper edge and removes said edge from fold 8 for the purposes hereinbefore set forth. Emphasis is laid on the fact that these extensions are permanently affixed to the collar, and in this connection there is further emphasis upon the rivets 5 and the projecting ribs or beads 6 and 9 about the same, which show that both the collar and the extensions are shaped up in dies with corresponding and matching ribs and depressions alternately, so that there is a double rib or bead formation about each rivet, and that the said rivets 5 are engaged through said formations so as to leave a higher surface on both sides than the rivet and thus protect the neck as well as the necktie from contact with the rivets. This also protects the collars when packed together in boxes for sale from becoming soiled by rubbing against the rivets, which is very important commercially. Otherwise collars are liable to be rendered unsalable by such contact.

The shape or style of the collar and its fit to the neck is largely dependent upon the fixed relation of the extensions to the collar. Thus, it will be seen if one extension is not properly set or should become loosened or displaced, one side of the collar would stand higher than the other at the front which would be a very serious objection indeed. A pair of eyelets or rivets to fix the extensions permanently in place is therefore needed, and thereafter no displacement is possible short of actual destruction of the extension or collar. A single rivet would be objectionable in view of the foregoing because a pivotal connection between the parts would thereby be obtained which would be apt to throw the collar out of true line and fixed relationship at the front. I prefer to use means such as will safely assure an immovable or fixed fastening of the extensions to the collar, and two or more rivets or eyelets are therefore employed by me as well as cementing the extensions in place.

By tapering the extensions down and away from the fold or turn at the meeting or front end of the collar, the collar as already stated is left free to curve and shape itself to the neck without undue strain upon the extensions and corner at —2—, the weakest point, but nevertheless the meeting edges of the collar band 3 are overlapped their full depth and approximately from the corner 2 downward so that a perfect alinement and fit will be obtained at said meeting edges.

It must be remembered that the greatest strain placed upon a collar is at the time it is put on and buttoned by the wearer. This is the time when the parts are bent, twisted and pulled in every conceivable manner, and in a celluloid collar the eventual result is cracking and breakdown at the fold line. My extension may be regarded as a substantially integral part of the collar to resist the strains upon the collar as aforesaid, but has all the advantages that a free extension will afford. In the making of the collar the extensions are cemented in place on forms to obtain accurate alinement and relation of the extensions to the collar, especially at the fold or turning point —2— and the rivets are then applied and the button holes lastly formed in the extensions. Otherwise it would be practically impossible to get perfect uniformity in all collars of a given size. The permanently affixed extensions assure such uniformity during wear and being free and constructed all as shown and described, the life and fit of the collar is also assured.

The combined cement and rivet union between the tabs and the collar is effective and of material advantage for the obvious reason that the cement union acts primarily to prevent lateral shift of the tab on the collar and resists end pulling strains on the tab, and the rivet union prevents peeling or stripping of the tab where cemented when the tab is flexed outwardly by the wearer in removing the collar.

What I claim is:

1. A lay-down collar and button hole extensions thereon tapered from their outer to their inner ends, and a plurality of rivets through the inner end of each extension and the band of the collar, said extensions having substantially the same width as the band of the collar at its transverse end edges, thereby covering said edges.

2. A collar having a band and a turn down portion, and button hole extensions permanently secured to said band by a plurality of rivets through their inner ends, said extensions gradually tapered from end to end and having their lower edges parallel and flush with the bottom edge of said band and their upper edges at an inclination thereto, whereby the transverse end edges of the bands are overlapped their entire width and the upper portion of the band within and behind the turn down portion is open and free to flex and bend.

3. A collar having separate buttonhole attachments rigidly secured to the ends thereof and embossed through both attachment and collar at the points of fastening to provide interlocking engagement between the parts.

4. A collar having a separate button-hole attachment at each end cemented in place upon the collar and embossed through the double thicknesses thereof to provide locking engagement between the parts.

5. A collar having button-hole members riveted thereto and having annular beads about said rivets raised out of the stock of the collar, thereby protecting the neck of the wearer.

6. A collar having button-hole members affixed to its ends by means of rivets, and protecting means upon said collar about said rivets to prevent end contact therewith.

7. A collar having buttonhole members cemented thereto and the said parts embossed in their cemented portions, and rivets rigidly locking said parts together through said embossed portions.

8. A collar having separate button-hole tabs cemented thereto back from the transverse meeting edges of the collar, and a plurality of rivets at said cemented place passing through both the body of the collar and the tabs to firmly unite the said parts and prevent stripping or displacement of the stock.

9. A folded collar having separate buttonhole tabs permanently secured upon the front face of the band portion and overlapping the transverse meeting edges thereof and free to play back and forth in respect thereto, and means to immovably fix the tabs in place upon the collar relative to their respective top and bottom edges, and said tabs having the same relative depth as the band of the collar with the upper edge thereof relatively close to the folded corners of the collar.

10. A celluloid or like collar having separate buttonhole tabs cemented to the body portion thereof back from its transverse meeting edges and uncemented about said edges to permit free flexing of the tabs back and forth in respect to the body of the collar, and said tabs and cemented union being permanently fixed by fastening devices passing through the tabs and the body where cemented for the purposes set forth.

11. A collar having separate buttonhole tabs and devices passing through said parts to secure the same permanently together, and a protecting portion extending beyond and surrounding said devices at their exposed ends to prevent defacement of the collars when packed within one another and adapted to prevent injury to the wearing apparel worn about the collar.

In testimony whereof I sign this specification in the presence of two witnesses.

ARTHUR H. PARSONS.

Witnesses:
R. B. MOSER,
E. M. FISHER.

---

Copies of this patent may be obtained for five cents each, by addressing the "Commissioner of Patents, Washington, D. C."